US009685008B2

(12) United States Patent
Lambrinos et al.

(10) Patent No.: US 9,685,008 B2
(45) Date of Patent: Jun. 20, 2017

(54) METHOD AND SYSTEM FOR SECURING A VEHICLE OFFERED FOR RENT, AND VEHICLE RENTAL FACILITY IMPLEMENTING SUCH A SYSTEM OR SUCH A METHOD

(71) Applicant: Bluecarsharing, Vaucresson (FR)

(72) Inventors: Clement Lambrinos, Montreuil (KR); Aymeric Augustin, Ville d'avray (FR); Raphael Barrois, Paris (FR); Sandrine Ressayre, Auffargis (FR); Franck Thieulent, Saint Ouen (FR); Francis Aaron, Houilles (FR); Laurent Perrier, Attiches (FR)

(73) Assignee: Bluecarsharing, Puteaux (FR)

( * ) Notice: Subject to any disclaimer, the term of this patent is extended or adjusted under 35 U.S.C. 154(b) by 0 days.

(21) Appl. No.: 14/348,022

(22) PCT Filed: Sep. 27, 2012

(86) PCT No.: PCT/FR2012/052181
§ 371 (c)(1),
(2) Date: Mar. 27, 2014

(87) PCT Pub. No.: WO2013/045842
PCT Pub. Date: Apr. 4, 2013

(65) Prior Publication Data
US 2014/0236417 A1    Aug. 21, 2014

(30) Foreign Application Priority Data
Sep. 30, 2011   (FR) ..................................... 11 58863

(51) Int. Cl.
*G01C 22/00*       (2006.01)
*G05D 1/00*        (2006.01)
(Continued)

(52) U.S. Cl.
CPC ............. *G07C 5/008* (2013.01); *G06Q 10/10* (2013.01); *G07C 5/0816* (2013.01); *G07B 15/02* (2013.01)

(58) Field of Classification Search
CPC ...... G07C 5/008; G07C 5/0816; G08G 1/123; G08G 1/127; G08G 1/0968; G06Q 40/00; G06Q 10/10; G07B 15/02
(Continued)

(56) References Cited

U.S. PATENT DOCUMENTS

2002/0184062 A1   12/2002  Diaz
2003/0050038 A1*   3/2003  Haave et al. ................. 455/404
(Continued)

FOREIGN PATENT DOCUMENTS

FR           2876814 A1    4/2006

OTHER PUBLICATIONS

European Patent Office; Search Report in International Patent Application No. PCT/FR2012/052181 dated Jan. 4, 2013; 6 pages.
(Continued)

*Primary Examiner* — Isaac Smith
(74) *Attorney, Agent, or Firm* — Wood Herron & Evans LLP

(57) ABSTRACT

The invention relates to a method (200) for securing a traveling electric vehicle offered for rent; said method including the following steps: measuring (206) at least one value of at least one parameter relating to said vehicle, comparing (208) the value of said parameter to at least one predetermined value, and reporting (220) an anomaly, on the basis of the result of the comparison step; wherein the reporting step is initiated by a so-called central site remote from the vehicle. Said invention likewise relates to a system implementing such a method and an automated vehicle rental facility implementing such a method or such a system.

15 Claims, 2 Drawing Sheets

(51) Int. Cl.
  *G07C 5/00*  (2006.01)
  *G06Q 10/10*  (2012.01)
  *G07C 5/08*  (2006.01)
  *G07B 15/02*  (2011.01)

(58) Field of Classification Search
  USPC .......... 701/31.4, 31.5, 23; 455/404.1, 404.2; 340/636.1, 428
  See application file for complete search history.

(56) References Cited

U.S. PATENT DOCUMENTS

| | | | |
|---|---|---|---|
| 2010/0030586 A1* | 2/2010 | Taylor | G06Q 40/08 705/4 |
| 2011/0282527 A1* | 11/2011 | Inbarajan | B60L 11/1809 701/22 |
| 2012/0053778 A1* | 3/2012 | Colvin | G07C 5/008 701/29.4 |
| 2012/0187916 A1* | 7/2012 | Duer | B60L 11/1862 320/136 |

OTHER PUBLICATIONS

French Patent Office; Search Report in French Patent Application No. 11 58863 dated May 16, 2012; 3 pages.

Maes; Publication Entitled "SDP-based IP and Multimedia Real Time Communications Integration with Vehicle Remote Monitoring, Monitoring and Emergency Systems" dated Oct. 2008; 6 pages.

Zhao; Publication Entitled "Telematics: Safe and Fun Driving" dated Jan. 2002; 5 pages.

Gallais; Publication Entitled "A Car-Anywhere, Anytime" dated Mar. 2007; 8 pages (article on p. 5 of submission).

* cited by examiner

METHOD AND SYSTEM FOR SECURING A VEHICLE OFFERED FOR RENT, AND VEHICLE RENTAL FACILITY IMPLEMENTING SUCH A SYSTEM OR SUCH A METHOD

TECHNICAL FIELD

The present invention relates to a method for securing a vehicle available for rental. It also relates to a system for securing such a vehicle and such a secured vehicle.

The field of the invention is the field of securing electric vehicles, in particular when the vehicle is being driven.

BACKGROUND

Vehicles that operate with one or more electric batteries, and sites, called rental sites, allowing the collection of a rental vehicle or the return of a rented vehicle at the end of rental, are currently known.

However, currently no method or system exists making it possible to protect the rented vehicle or carry out the appropriate actions as soon as possible when an incident occurs while it is being driven. In fact, the user has to rely on his own resources and cannot receive assistance from the operators of the service, who know the vehicle better than he does.

A purpose of the invention is to overcome the abovementioned drawbacks.

Another purpose of the invention is to propose a method and a system making it possible to warn a user renting the vehicle and to make all appropriate arrangements when an incident occurs while the vehicle is being driven.

SUMMARY

The invention proposes to achieve at least one of the abovementioned purposes by a method for securing a vehicle when it is being driven, in particular an electric vehicle, available for rental, said method comprising the following steps:
  measuring at least one value of at least one parameter relating to said vehicle,
  comparing the value of said parameter with at least one predetermined value, and
  signalling an anomaly, depending on the result of the comparison step,
in which the signalling step is initiated by a site remote from the vehicle, called a central site.

Thus, the method according to the invention makes it possible to monitor the state of the vehicle when the latter is in traffic.

The method according to the invention therefore makes it possible to guide the user when an anomaly occurs when the vehicle is being driven and also to identify an anomaly occurring during this unmonitored phase in order to be able to optimize the management of the vehicle. This guidance, initiated remotely, is then particularly suitable to the circumstances since it can allow the user to obtain information depending not only on the anomaly detected but also on his surroundings, etc.

During the comparison step, it is possible to verify if the measured value is equal to the predetermined value, or if it is less than or greater than the predetermined value.

Advantageously, for at least one parameter, the vehicle can comprise at least one sensor for measuring the value of this parameter relating to the vehicle.

The measured value can be sent directly to the remote site by the vehicle over a wireless network, such as a mobile phone network, for example the GPRS network.

In this case, the measured values can be sent to the remote site periodically, at the request of the remote site, or following a predetermined event.

The measured value can be sent in the form of a data frame also comprising an identification number relating to the vehicle.

The data can also be sent by means of a wired connection.

Alternatively, for at least one parameter, the value of the parameter is measured by the central site for example by a central server, for example from data sent by another element of the system or the installation in which the invention is implemented, such as a GPS server, or by another element of the system, such as the GPS server.

The comparison step can be carried out by the vehicle or by another element of the system, which then sends the result of the comparison to the central site, for example only if the comparison indicates that there is an anomaly. It can also be carried out by the central site.

The method according to the invention can also comprise a step of identifying at least one user by reading an identifier of said user, in order to ensure that the user requesting a vehicle is indeed a known user. The identifier of the user is then associated with an item of data identifying the vehicle, which makes it possible for the remote site to know which user is renting the vehicle.

The identification step can be carried out via a terminal of a rental site and/or from the vehicle during collection of the vehicle, in order to ensure that the user attempting to access the vehicle is indeed a previously authorized user.

The identification step(s) can be carried out using RFID identification means held by the user, which can be read by the different elements of the system. Other means of identification (key, barcode, entering information, etc.) can also be used.

The signalling step can comprise a step of emitting an audible and/or light signal on the vehicle, controlled by the remote site. The signal is intended to warn the user.

This can be a message displayed on the on-board computer of the vehicle for example. This message, transmitted from the central site makes it possible to indicate to the user what actions are to be preferably carried out to avoid any serious problem in response to the anomaly.

The signalling step can, in addition to and/or replacing the step previously described, comprise the transmission of at least one item of notification data to a communication device of the user or of a third party, for example a system operator or the emergency services.

The item of notification data is generally sent by the central site.

The item of notification data can be transmitted to the user or the operator to a portable communication device held by him (mobile phone, PDA, etc.), in the form of an SMS, MMS message, or e-mails, etc. An item of data identifying his communication device can be associated with the identification data of the user in a database of the central site.

Of course, the same notification data or different data can be transmitted to different addressees.

When the item of data is sent to an operator, this operator can in particular be a call centre agent who can then call the user, on his personal communication device or directly in the vehicle, in the case where the vehicle comprises an integrated telephone.

The parameter measured can be a parameter giving information on:

the state of charge of a battery of the vehicle (critical level), an impact suffered by the vehicle (impact detection), a state of an airbag of the vehicle (deployment of an airbag), a parameter relating to the location of the vehicle (last measured timestamped location of the vehicle).

Most of the parameters are measured by sensors arranged on the vehicle. The parameter concerning the location of the vehicle, on the other hand, is measured by the remote site which verifies the time elapsed since the last location signal was received.

Each of the sensor elements of the vehicle can be connected to a control module within the vehicle that centralizes all of the values sent by all of the sensors.

The control module can send the values measured at the vehicle over a communications network.

In a particular embodiment of the method, the measured value of one and the same parameter is compared with two predetermined values. It is determined if a signalling step is to be carried out depending on the result of the comparison of the measured value with a first predetermined value and, if necessary, as the remote site is capable of initiating at least two signalling sequences, which signalling sequence will be carried out during the signalling step, depending on the result of the comparison of the measured value with the second predetermined value.

This embodiment is in particular carried out when the measured parameter is a numerical parameter, such a parameter capable of being for example a parameter relating to the state of charge of the battery.

Alternatively, the measured values of two separate parameters are each compared with a corresponding predetermined value. As the remote site is capable of initiating at least two signalling sequences, the signalling sequence carried out during the signalling step is determined depending on the result of the two comparisons.

In this way, the actions to be carried out can be better adapted depending on the seriousness of the situation.

Moreover, it can also be envisaged that, following the comparison step, at least one item of vehicle data and/or one item of user data is associated with an item of anomaly data in a database, stored in particular at the remote site.

This makes it possible to carry out subsequent processing steps relating to the vehicle or to the user depending on the events arising when driving.

This makes it possible in particular to keep a log of the anomalies of this vehicle in order to determine if the vehicle may suffer a more serious breakdown. This can also make it possible to identify users causing accidents, in the case where the occurrence of impacts is detected, and optionally imposing penalties in the event of repeated accidents.

According to another aspect of the invention, a system is proposed for securing a vehicle available for rental when it is being driven, said system comprising:

detection means for measuring a parameter relating to an element of said vehicle, means, called comparison means of the vehicle, for comparing at least one value of at least one detected parameter with at least one predetermined value, and means of signalling an anomaly, capable of being activated depending on the result of the comparison, these means being intended to be controlled by a site remote from the vehicle.

The signalling means can in particular be means of emitting an audible and/or light signal, arranged on/in the vehicle, or means of transmission of at least one item of notification data to a user or an operator.

Said at least one element of the vehicle can be a battery, an airbag, a part of the bodywork of the vehicle etc.

Advantageously, the system comprises moreover means of transmitting data from said vehicle to said remote site, for example means of transmission over a wireless communications network such as the GPRS network.

The detection means can in particular comprise a sensor means arranged on the vehicle and comprising at least a force sensor, a location sensor, etc.

The invention applies particularly to the management of a fleet of interchangeable electric vehicles intended for rental and for which a plurality of docking stations is provided.

According to another aspect of the invention, an installation is proposed for the automated rental of vehicles comprising a plurality of vehicles available for rental and at least one rental site comprising a parking space for a vehicle, the installation comprising:

a system according to the invention, or means for implementing the steps of the method according to the invention.

BRIEF DESCRIPTION OF THE FIGURES

Other advantages and characteristics will become apparent on examination of the detailed description of embodiments which are in no way limitative, and the attached drawings in which.

DETAILED DESCRIPTION

It is understood that the embodiments which will be described below are in no way limitative. It is possible in particular to envisage variants of the invention comprising only a selection of the features described below, separately from the other features described, if this selection of features is sufficient to confer a technical advantage or to differentiate the invention from the state of the prior art. This selection comprises at least one preferably functional feature without structural details, or with only some of the structural details if this part alone is sufficient to provide a technical advantage or to distinguish the invention from the prior art.

In particular all the variants and embodiments described can be combined with each other if there is no technical objection to this combination.

Figure 1:
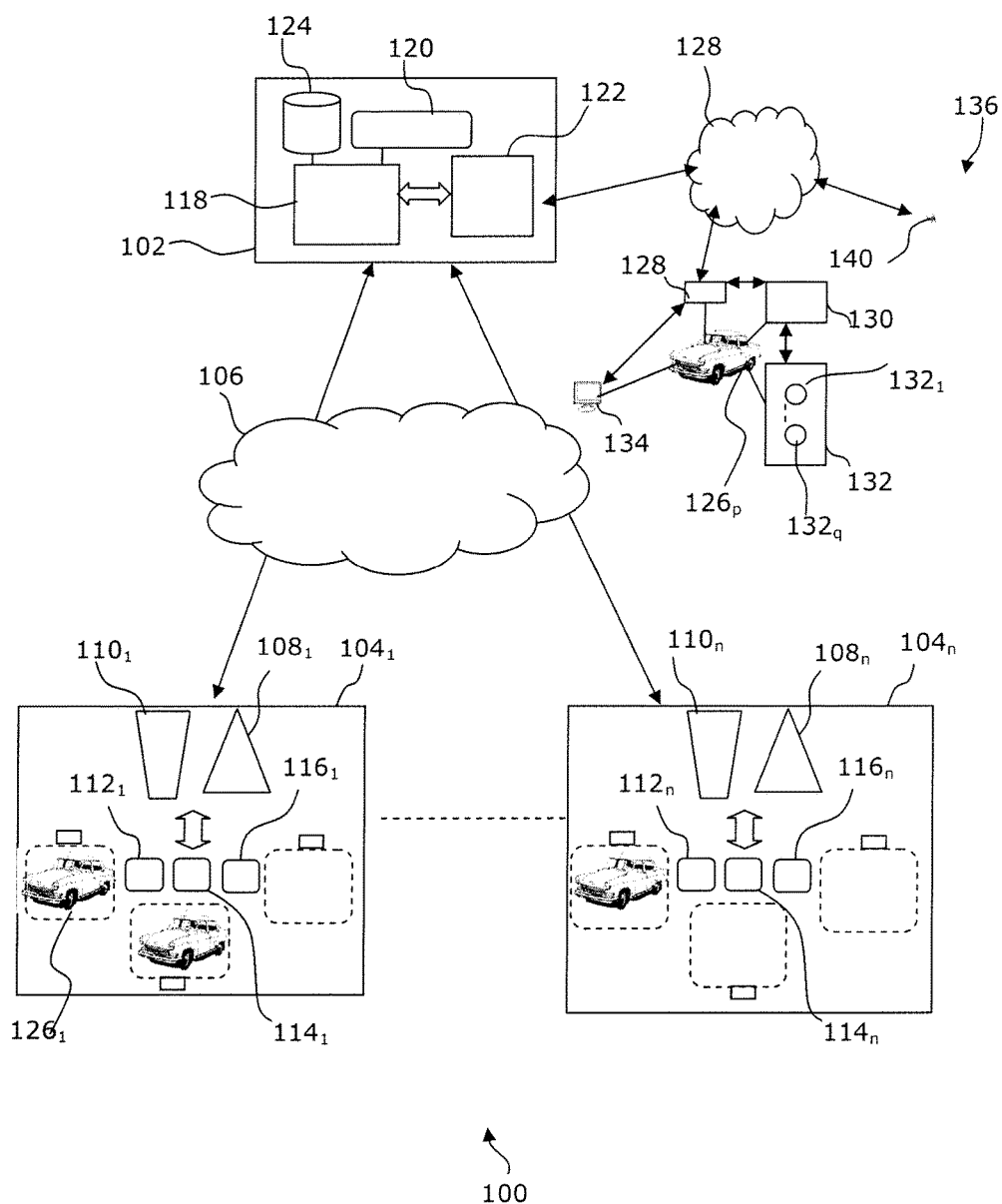
FIG. 1 is a diagrammatic representation of a system for managing a fleet of vehicles available for rental at the location in which the invention can be implemented.

FIG. 1 is a diagram of an overall management system of a fleet of electric vehicles available for rental.

The system 100 shown in FIG. 1 comprises a central site 102 (also called central agency in the remainder of the description) connected to several sites—or stations—$104_1$-$104_n$, called rental sites, by means of a wireless communication network 106, for example GPRS, or a wired network, for example of DSL type. Preferably, each station is linked to the central site via two separate networks, which enables continuous connection even if one of the networks fails.

Certain rental sites comprise a subscription terminal 108 for the registration of a new subscriber.

Each rental station comprises a rental terminal 110 for the rental of a vehicle and several charging terminals 112-116, each rental terminal being provided for charging a vehicle equipped with an electric battery at a parking space.

The central site 102 can be connected directly to each of the terminals of a rental station 104 over the network 106 or solely to the subscription terminal and/or the rental terminal and/or the charging terminals 112-116.

At least two terminals of a rental station are connected to each other via a wired connection (not shown).

The central site 102 comprises a central management server 118, a calculation and analysis module 120, called central calculation and analysis module, and a communication module 122, called central communication module. The central site 102 comprises moreover a database 124 in which are saved, in association with each vehicle identifier, the identifier of the user to whom this vehicle is rented, and other data relating to the vehicle and, in association with an identifier of a user, data relating to the user.

The system also comprises a plurality of vehicles $126_1$-$126_p$ some of which are connected to charging terminals at the rental sites while others are currently rented, in particular travelling on the public highway, and remote from any rental site.

Each vehicle comprises a GPRS antenna 128 allowing communication by the vehicle with the communication module 122 of the central site 102 and a unit 130 forming a control module linked to the antenna as well as to the different elements $132_1$-$132_q$ (elements and sensors, such as an impact detection or battery sensor) of the vehicle making it possible to control these and forming the link between these different elements. The unit 130 also comprises data storage means.

The vehicle also comprises a user interface 134, formed by an on-board PC, also capable of communicating with the central site by means of the GPRS antenna 128.

The central site 102 is also arranged to exchange information with a user 136 or a third party, such as an operator, if this person is equipped with a portable communication device 140 such as a PDA, a mobile phone, etc., also linked to a GPRS network.

As explained above, the general principle of the invention is as follows:
 measuring a parameter of the vehicle, by a sensor placed on the vehicle or at a remote site and comparison of the measured value with at least one predetermined value,
 depending on the result of the comparison, a signalling step is carried out which makes it possible of warn the user and/or a third party.

The element the status of which is verified is as follows:
airbag of the vehicle; has it been deployed, and/or
bodywork of the vehicle: has there been an impact, and/or
battery of the vehicle: is the charge level below a predetermined level, and/or
GPS beacon of the vehicle: can the location of the vehicle be accessed, etc.

The charge level of the battery can be verified by polling the battery itself. Similarly, deployment of the airbag can be verified at the airbag or a sensor associated with the latter. An impact is detected using one or more force sensors placed on the bodywork.

The information originating from these elements or sensors is sent to the control module 130 centralizing all the information originating from the vehicle and communicating with each element of the latter.

When the GPS module of the vehicle is verified, it is possible to carry out this comparison at the central site which receives the location information from a GPS server.

Figure 2:
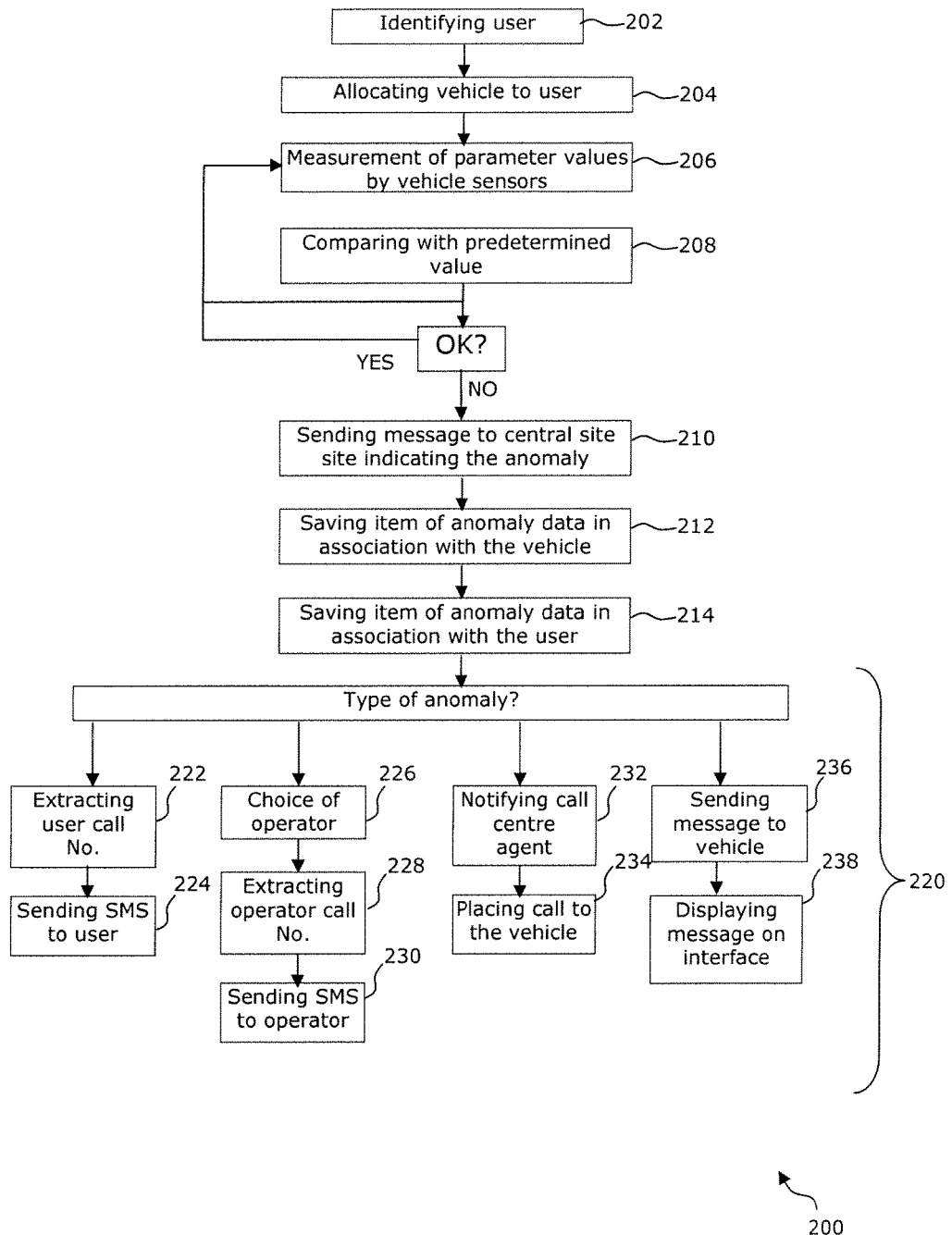
FIG. 2 is a diagram of a method according to an embodiment of the invention.

A method 200 according to an embodiment of the invention will now be described, using FIG. 2 representing a diagram of the method.

Firstly, the user takes possession of the vehicle. In order to do this he must first carry out an identification step 202. This step can be carried out directly at a charging terminal by using a means of identification such as an RFID card. The charging terminal can in fact comprise an RFID reader. This step could however be carried out by other means, such as by entry on a keyboard. This step can also carried out at the rental terminal of the rental site.

The identification step involves the participation of the central site 102 which comprises a database holding the users' access rights. The charging terminal or the rental terminal communicates the user identifier to the central site and the central site returns data relating to this user, for example, a rental authorization, a notification that a rental is in progress, etc.

If the user is allowed to take possession of the vehicle (because he is a valid subscriber, he does not already have a rental vehicle, etc.), the vehicle is allocated to him in step 204, which consists in particular of a step of association in a database stored at the central site 102 of an item of identification data of the user with an item of identification data of the vehicle, as well as a step of sending the item of identification data of the user to the vehicle which stores it in its memory. The user then takes possession of the vehicle, and starts it.

When the vehicle is being driven, the sensor and the elements of the vehicle send to the control module 130 many items of information relating to different parameters, in particular measurements of such parameters, as described above. This step is a measurement step referenced 206 in FIG. 2. The control module then transmits these measurements (generally constituted by binary or numerical values) to the central site, over the wireless telecommunications network linking the vehicle to this site.

The vehicle 126 then compares the measured values to predetermined values stored in its memory and determines if there is an anomaly on the vehicle or not. The control module 130 can then send feedback to the central site, only if it detects an anomaly, in step 210.

Whether an anomaly is detected or not, the measurements are carried out periodically, so that steps 206, 208 are continuously carried out.

The comparison of a measured value with a predetermined value can be a step during which it is verified:
 if the measured value is equal to the predetermined value. This is in particular the case when the measured value is a value of a Boolean parameter sent in particular by a sensor of the "go/no go" type, for example indicating that the airbag has deployed or not, or
 if the measured value is less than or greater than a predetermined value. This is in particular the case when the measured value is a value of a numerical parameter, such as the charge level of a battery.

In a variant, the measurements can be then be transmitted to the central site which carries out the comparison step itself. These measurements are transmitted at regular intervals or at the request of the central site.

When the central site receives a message from the vehicle, it extracts from the message an identifier of the vehicle from which the message originates, the control module 130 having included this identifier in the content of the message. In a variant, the central server can determine this identifier by consulting a database in which the call number of the vehicle (which it is able to determine in a conventional fashion using information from the telecommunication network,) is associated with its identifier.

Once the central site has been informed of an anomaly, in a step 212 it saves in a database stored in its storage means an item of data relating to this anomaly. The item of data is of course saved in association with the identifier of the vehicle affected by the anomaly.

An item of data relating to the anomaly can also be saved in a database in a step 214, in association with the item of identification data of the user, which could for example make it possible subsequently, using statistical processing, to determine a user making an "unacceptable" use of the rental vehicle and to impose a penalty on this user, enforcing for example a less advantageous pricing policy; or to offer a rental discount to a client having experienced a technical problem during the rental.

The user concerned is determined using data already registered in the database and associating the user with the vehicle. This determination can also be carried out using time-related data (by comparing the times of starting and optionally of ending rental of the vehicle by the user with the time of the message). This makes it possible to reliably retrieve the user who suffered the problem even if sending of the message is delayed due to a problem with the network for example.

If an anomaly in the vehicle is determined, as indicated above, this anomaly is signalled to the user. The step of signalling the anomaly can be carried out in several ways, optionally combined together:
 warning by SMS, email, phone call on the user's mobile phone,
 warning via a vehicle interface,
 warning a third party (operator, emergency services),
 calling the vehicle.

In any event, the action of signalling the anomaly is initiated by the central site. Depending on the type of anomaly, the following actions can be carried out:
 determining the user renting the vehicle, as explained above, then in a step 222 extracting from the database of the server a numerical address associated with the user and in a step 224 sending to the numerical address an SMS message that is predetermined depending on the anomaly; and/or
 extracting from the database of the central site, in a step 228, the numerical address of an operator chosen in a step 226 according to certain criteria (on duty, location, etc.), and in a step 230 sending to the numerical address an SMS message that is predetermined depending on the anomaly; and/or
 notifying a call centre agent, in a step 232, that he must call the vehicle, the message containing a call number or at least an identifier of the vehicle. The call centre agent then calls the vehicle in a step 234; and/or
 sending a predetermined message, in a step 236, from the central site to the call number of the vehicle, the latter then displaying the message on its interface screen in step 238. The message is therefore not produced inside the vehicle but on the instructions of the central site.

Examples of warning the user will now be described in different cases.

In a first example, the measured value of the parameter relates to the charge level of the battery. In this case, the measured value is compared to two values: a first value indicating a low charge level and a second charge level indicating a critical charge level.

Therefore, firstly the measured value is compared with the first predetermined value. If the measured value is above this level, no signalling action is initiated.

If the measured value is below this level, then the measured value is compared with the second predetermined value. If it is greater than the second predetermined value, a first signalling sequence is initiated (optionally followed by sending a message from the vehicle to the central site). During this sequence, a first message is sent from the central server to the vehicle so that this message is displayed on the user interface of the vehicle. This message requests the user in particular to park the vehicle as soon as possible at one of the nearest stations. This message can in particular include a map with the location of the rental stations in order to facilitate the task of a user.

If the measured value is less than the second predetermined value, a second signalling sequence is initiated. During this sequence, a second message is sent from the central server to the vehicle so that this message is displayed on the user interface of the vehicle. This message requests the user to park the vehicle as soon as possible by the roadside as there is a risk of it stopping very soon. The central site can also and in parallel send a warning SMS to an operator chosen so that he will come to fix the vehicle. The message then comprises the location of the vehicle, this having been received beforehand from the vehicle or from a GPS server in communication both with the vehicle and the central site.

In a second example, the vehicle comprises a sensor for detecting collisions and a sensor for detecting the deployment of an airbag. For each of these sensors, the measured value is the value of a parameter of the sensor state corresponding to a Boolean type parameter.

Each of the state values from the sensor is compared with a predetermined value, and, this time, the signalling step is triggered if one of the values from the state sensors is equal to the corresponding predetermined value.

If none of the measured values is equal to the corresponding predetermined value, the signalling step is not initiated.

If the measured value for the parameter from the detection sensor is equal to the predetermined value, but the value from the airbag sensor is not equal, it is considered that this is a "minor impact".

The central site then sends a message to the vehicle which displays it on its interface screen, requesting the user to report the accident, for example.

If the user reports the accident, for example via the user interface, then the user is authorised to continue his rental.

If the measured value for the parameter from the detection sensor is equal to the predetermined value and the value of the airbag sensor is also equal to the corresponding predetermined value, this is considered to be a "major impact", in which the user may potentially be injured.

A call is then transmitted to the vehicle or to a telephone number of the user in order to ascertain that the user is not injured.

If the user responds, he can be asked to respond to certain questions about the incident and then he is authorised to complete his journey.

If, at the end of a predetermined time, the user does not respond to the transmitted call, the vehicle can be polled for its location in order to determine whether it is mobile. If the location of the vehicle has not changed, it is highly probable that the user is injured and cannot respond to the calls.

The emergency services are alerted so that they can attend the accident site. Such an alert can be carried out for example by sending an SMS to a predetermined emergency call number stored in a database of the server. The SMS can comprise data such as the location of the vehicle and the time of the incident and optionally the registration number of the vehicle, and be sent from the central site once the call centre agent responsible for the call has reported the absence of a response from the user.

In this case, the nature of the warning step therefore depends on the measured values of two separate parameters.

In a third example, the measured parameter relates to the GPS beacon of the vehicle. In fact, data relating to the location of the vehicle are regularly transmitted to the central site by a GPS server in communication with the GPS beacon of the vehicle and with the central site.

The measured parameter in this case is the time of the last location sent by the GPS server. The period between this value and the current time (measured value) is compared with a predetermined time interval (predetermined value). If, after this comparison, it is apparent that the measured value is greater than the predetermined time interval and therefore the last sending of data relating to the location of the vehicle took place some considerable time ago, this means that the GPS beacon of the vehicle is defective.

In this case, the signalling step comprises a step of notifying an agent at the call centre, initiated by the central site, requesting him to transmit a call to the vehicle as well as sending a message to the vehicle, the message requesting the user to contact a call centre agent. Then the user will be asked to give his geographical position and optionally to carry out checks on the vehicle in order to correct the anomaly.

It should be noted that the invention is not limited to what has been described above. The signalling examples are non-limitative. These examples can be combined on one and the same vehicle. It is also possible for the same results of a comparison step not to trigger one and the same warning.

Moreover, parameters other than those described can be measured, the predetermined values may not be chosen as indicated, etc.

Of course the invention is not limited to the examples which have just been described.

What is claimed is:

1. A method for securing a vehicle available for rental when it is being driven, said method comprising:
    measuring at least one value of at least one parameter relating to a charge level of a battery of the vehicle, the vehicle belonging to an installation for automated rental of electrical vehicles comprising a central site and several rental stations;
    comparing the at least one value of at least one parameter with at least one predetermined value of the battery;
    signalling an anomaly in the vehicle, depending on the result of the comparison step, said signalling step being initiated by the central site; and
    associating at least one item of vehicle data and/or one item of user data with an item of anomaly data in a database;
    wherein the at least one predetermined value relates to a critical charge level and a low charge level of the battery, the method further comprising:
    determining whether the at least one value of at least one parameter corresponds to between the low charge level and the critical charge level; and
    in response to determining the at least one value of at least one parameter corresponds to between the low charge level and the critical charge level, initiating a first signalling sequence;
    wherein the first signalling sequence includes:
        sending a first message to the vehicle, wherein the first message includes a request to park the vehicle at a rental station of said installation, and
        displaying the first message on a user interface of the vehicle;
    the method further comprising:
    determining whether the at least one value of the at least one parameter corresponds to below the critical charge level; and
    in response to determining the at least one value of the at least one parameter corresponds to below the critical charge level, initiating a second signalling sequence;
    wherein the second signalling sequence includes:
        sending a second message to the vehicle, wherein the second message includes a request to park the vehicle by a roadside, and
        displaying the second message on a user interface of the vehicle.

2. The method according to claim 1, wherein the database is stored at the central site.

3. The method according to claim 1, wherein the vehicle comprises a sensor for measuring the at least one value of at least one parameter relating to the charge level.

4. The method according to claim 1, wherein the at least one value of at least one the parameter is measured by the central site.

5. The method according to claim 1, further comprising identifying at least one user renting the vehicle by reading an identifier, the identifier being associated with an item of identification data of the vehicle.

6. The method according to claim 5, wherein at least one of:
    the identifier is of the RFID type, or
    the item of identification data of the vehicle is at the level of the remote site.

7. The method according to claim 1, wherein signalling an anomaly comprises transmitting a light or audible signal on the vehicle.

8. The method according to claim 1, wherein signalling an anomaly comprises transmitting at least one item of notification data to a communication device of the user or of a third party.

9. The method according to claim 1, wherein the remote site is capable of initiating at least two signalling sequences, said method further comprising:
    comparing the at least one value of at least one parameter with two predetermined values; and
    determining the following:
        if a signalling step is to be carried out depending on the result of the comparison of the at least one value of at least one parameter with a first predetermined value, and
        which signalling sequence will be carried out during the signalling step depending on the result of the comparison of the at least one value of at least one parameter with the second predetermined value.

10. A system for securing a vehicle available for rental when it is being driven, said system comprising:
    a sensor for detecting the state of at least one parameter relating to a charge level of a battery of said vehicle, said vehicle belonging to an installation for automated rental of electrical vehicles comprising a central site and several rental stations;
    a control module configured to compare the detected state of at least one parameter to at least one predetermined value;

a speaker or a display capable of being activated to signal an anomaly in the vehicle depending on the result of the comparison, wherein the speaker or the display is controlled by the central site; and a database in which at least an item of anomaly data is associated with at least one item of vehicle data and/or one item of user data;

the central site sending at least a first message to the vehicle when the detected state of the at least one parameter corresponds to a value between a critical charge level and a low charge level of the battery, the first message including a request to park the vehicle at a rental station of the installation; and the central site sending at least a second message to the vehicle when the detected state of the at least one parameter corresponds to a value below the critical charge level of the battery, the second message including a request to park the vehicle by a roadside.

11. The system of claim 10, wherein the database is stored at a remote site.

12. The method of claim 1, wherein the first message further includes a map with the location of the rental station thereupon.

13. The method of claim 1, wherein the second signalling sequence further includes:

collecting the location of the vehicle; and sending a third message to an operator, wherein the third message includes a request for assistance and the location of the vehicle.

14. A method for securing a rental vehicle powered by a battery, the vehicle belonging to an installation for automated rental of electrical vehicles comprising a central site and several rental stations, the method comprising:

measuring with a sensor on the vehicle a value of at least one parameter related to a charge level of the battery;

transmitting data related to the measured value to the central site over a wireless communications network;

determining with a processor at the central site whether the value of at least one parameter is between a low charge level and a critical charge level of the battery;

in response to determining the value of at least one parameter is between the low charge level and the critical charge level:

sending a first message from the central site to the vehicle over the wireless communications network; and displaying the first message on a user interface of the vehicle;

the first message including a request to park the vehicle at a rental station of the installation;

determining whether the measured charge level is below the critical charge level; and in response to determining the value of at least one parameter is below the critical charge level:

sending a second message from the central site to the vehicle; and displaying the second message on the user interface of the vehicle.

15. The method of claim 14, wherein the second message includes a request to park the vehicle immediately.

* * * * *